United States Patent [19]

Jameson et al.

[11] Patent Number: 5,370,830

[45] Date of Patent: * Dec. 6, 1994

[54] HYDROSONIC PROCESS FOR FORMING ELECTRET FILTER MEDIA

[75] Inventors: Lee K. Jameson, Roswell; Bernard Cohen, Berkley Lake, both of Ga.

[73] Assignee: Kimberly-Clark Corporation, Neenah, Wis.

[*] Notice: The portion of the term of this patent subsequent to Dec. 14, 2010 has been disclaimed.

[21] Appl. No.: 949,606

[22] Filed: Sep. 23, 1992

[51] Int. Cl.$^5$ .............................................. B29C 59/04
[52] U.S. Cl. ........................................ 264/23; 264/22; 264/156; 425/174.2; 425/174.8 R
[58] Field of Search .................. 264/22, 23, 154, 156, 264/504, DIG. 48; 425/174.8 E, 174.8 R, 174.2; 55/155, DIG. 39

[56] References Cited

U.S. PATENT DOCUMENTS

| | | | |
|---|---|---|---|
| Re. 33,063 | 9/1989 | Obeda | 156/73.1 |
| 1,982,587 | 11/1934 | Wilkins | 204/6 |
| 2,289,177 | 7/1942 | Chandler | 154/43 |
| 2,533,609 | 12/1950 | Nolan et al. | 18/47.5 |
| 2,740,184 | 4/1956 | Thomas | 28/78 |
| 3,025,585 | 3/1962 | Griswold | 28/1 |
| 3,097,149 | 7/1963 | Lacroix | 204/146 |
| 3,155,460 | 11/1964 | Mears | 29/183.5 |
| 3,253,317 | 5/1966 | Such | 28/76 |
| 3,333,032 | 7/1967 | Dickinson | 264/22 |
| 3,352,769 | 11/1967 | Ruben | 204/143 |
| 3,400,188 | 9/1968 | Olson | 264/156 |
| 3,451,884 | 6/1969 | Anno et al. | 161/53 |
| 3,488,240 | 1/1970 | Roberts | 156/73 |
| 3,571,679 | 3/1971 | VanTurnhout | 317/262 |
| 3,575,752 | 4/1971 | Carpenter | 156/73 |
| 3,594,134 | 7/1971 | Russell et al. | 29/191.4 |
| 3,635,609 | 1/1972 | Balamuth | 425/3 |
| 3,640,786 | 2/1972 | Carpenter | 156/73 |
| 3,642,967 | 2/1972 | Doll | 264/51 |
| 3,660,186 | 5/1972 | Sager et al. | 156/73 |
| 3,683,736 | 8/1972 | Loose | 83/16 |
| 3,713,960 | 1/1973 | Cochran, II | 161/66 |
| 3,723,754 | 3/1973 | Murayama et al. | 364/22 |
| 3,756,880 | 9/1973 | Graczyk | 156/73 |
| 3,790,652 | 2/1974 | Colijn et al. | 264/146 |
| 3,794,174 | 2/1974 | Booman et al. | 210/321 |
| 3,814,101 | 6/1974 | Kozak | 128/287 |
| 3,818,522 | 6/1974 | Schuster | 5/347 |
| 3,832,267 | 8/1974 | Chia-Seng Liu | 161/116 |
| 3,839,525 | 10/1974 | Doll | 264/154 |

(list continued on next page.)

FOREIGN PATENT DOCUMENTS

34013/84 4/1985 Australia .

(List continued on next page.)

OTHER PUBLICATIONS

"Ultrasonics/High Power", Kirk–Othmer *Encyclopedia of Chemical Technology*, vol. 23, pp. 462–479, ©1983.

(List continued on next page.)

*Primary Examiner*—Catherine Timm
*Attorney, Agent, or Firm*—Joseph P. Harps

[57] ABSTRACT

The application is directed toward a process for forming an electret filter medium. The process includes the steps of: (1) providing a thin film of a dielectric material; (2) placing the thin film on a pattern anvil having a pattern of raised areas wherein the height of the raised areas is greater than the thickness of the film; (3) conveying the film, while placed on the pattern anvil, through an area where a fluid selected from the group including one or more of water, mineral oil, a chlorinated hydrocarbon, ethylene glycol and a solution of 50 volume percent water and 50 volume percent 1 propanol is applied to the film; (4) subjecting the film to a sufficient amount of ultrasonic vibrations in the area where the fluid is applied to the film to microaperture the film with at least about 1,000 microapertures per square inch in a pattern generally the same as the pattern of raised areas on the pattern anvil and with each of the microapertures having an area ranging from about 10 to about 100,000 square micrometers; and (5) corona discharge treating the film to instill a positive charge of at least about 100 volts on one surface of the film and a negative charge of at least about 100 volts on the other surface of the film.

21 Claims, 3 Drawing Sheets

U.S. PATENT DOCUMENTS

| | | | |
|---|---|---|---|
| 3,881,489 | 5/1975 | Hartwell | 128/287 |
| 3,886,941 | 6/1975 | Duane et al. | 128/287 |
| 3,929,135 | 12/1975 | Thompson | 128/287 |
| 3,949,127 | 4/1976 | Ostermeier et al. | 428/137 |
| 3,956,450 | 5/1976 | Abe et al. | 264/201 R |
| 3,963,309 | 6/1976 | Schwab | 350/104 |
| 3,966,519 | 6/1976 | Mitchell et al. | 156/73.1 |
| 3,989,867 | 11/1976 | Sisson | 428/132 |
| 3,998,916 | 12/1976 | Van Turnhout | 264/22 |
| 4,028,033 | 6/1977 | Bryant | 425/183 |
| 4,105,724 | 8/1978 | Talbot | 261/112 |
| 4,215,682 | 8/1980 | Kubik et al. | 128/205.29 |
| 4,242,392 | 12/1980 | Yackiw | 428/85 |
| 4,311,542 | 1/1982 | Mueller et al. | 156/84 |
| 4,369,219 | 1/1983 | Goepp et al. | 428/138 |
| 4,375,718 | 3/1983 | Wadsworth et al. | 29/592 |
| 4,388,422 | 6/1983 | Gerteisen et al. | 523/137 |
| 4,389,211 | 6/1983 | Lenaghan | 604/383 |
| 4,406,720 | 9/1983 | Wang et al. | 156/73.2 |
| 4,414,045 | 11/1983 | Wang et al. | 156/73.2 |
| 4,414,244 | 11/1983 | Timberlake et al. | 427/105 |
| 4,438,167 | 3/1984 | Schwarz | 428/138 |
| 4,439,475 | 3/1984 | Lang | 428/92 |
| 4,472,328 | 9/1984 | Sugimoto et al. | 264/41 |
| 4,488,928 | 12/1984 | Ali Kahn et al. | 156/495 |
| 4,588,537 | 5/1986 | Klaase et al. | 264/22 |
| 4,592,815 | 6/1986 | Nakao | 204/165 |
| 4,601,868 | 7/1986 | Radel et al. | 264/504 |
| 4,605,454 | 8/1986 | Sayovitz et al. | 156/73.1 |
| 4,609,518 | 9/1986 | Curro et al. | 264/504 |
| 4,623,438 | 11/1986 | Felton et al. | 204/168 |
| 4,629,643 | 12/1986 | Curro et al. | 428/131 |
| 4,645,500 | 2/1987 | Steer | 604/378 |
| 4,695,422 | 9/1987 | Curro et al. | 264/299 |
| 4,731,282 | 3/1988 | Tsukagoshi et al. | 428/220 |
| 4,735,843 | 4/1988 | Noda | 428/13 |
| 4,747,895 | 5/1988 | Wallerstein et al. | 156/73.3 |
| 4,775,571 | 10/1988 | Mizuno et al. | 428/141 |
| 4,777,073 | 10/1988 | Sheth | 428/155 |
| 4,778,644 | 10/1988 | Curro et al. | 264/557 |
| 4,798,604 | 1/1989 | Carter | 604/383 |
| 4,801,379 | 1/1989 | Ehrsam et al. | 210/498 |
| 4,815,714 | 3/1989 | Douglas | 264/22 |
| 4,842,794 | 6/1989 | Hovis et al. | 264/145 |
| 4,895,749 | 1/1990 | Rose | 428/132 |
| 4,898,761 | 2/1990 | Dunaway et al. | 428/137 |
| 4,900,317 | 2/1990 | Buell | 604/370 |
| 4,929,319 | 5/1990 | Dinter et al. | 264/22 |
| 4,931,343 | 6/1990 | Becker et al. | 428/95 |
| 4,944,854 | 7/1990 | Felton et al. | 204/168 |
| 4,955,164 | 9/1990 | Hashish et al. | 51/321 |
| 4,980,215 | 12/1990 | Schonbrun | 428/72 |
| 4,995,930 | 2/1991 | Merz et al. | 156/209 |
| 5,015,521 | 5/1991 | Fujii et al. | 428/220 |
| 5,059,454 | 10/1991 | Todd et al. | 427/259 |
| 5,098,755 | 3/1992 | Tanquary et al. | 428/35.5 |
| 5,116,662 | 5/1992 | Morman | 428/198 |
| 5,225,018 | 7/1993 | Zeldin et al. | 156/167 |

FOREIGN PATENT DOCUMENTS

| | | | |
|---|---|---|---|
| 0141556 | 5/1985 | European Pat. Off. | |
| 0259003 | 3/1986 | European Pat. Off. | |
| 0195113 | 9/1986 | European Pat. Off. | |
| 0203820 | 12/1986 | European Pat. Off. | |
| 0256717A2 | 2/1988 | European Pat. Off. | |
| 0283844 | 9/1988 | European Pat. Off. | |
| 0301599 | 2/1989 | European Pat. Off. | B29D 28/00 |
| 0302611A1 | 2/1989 | European Pat. Off. | |
| 0535581 | 4/1993 | European Pat. Off. | B26F 1/26 |
| 1334711 | 7/1963 | France | |
| 3723404A1 | 1/1989 | Germany | |
| 4130961 | 3/1992 | Germany | B29D 28/00 |
| 5038755 | 12/1975 | Japan | |
| 1018971 | 2/1966 | United Kingdom | |
| 1073605 | 6/1967 | United Kingdom | |
| 1253664 | 11/1971 | United Kingdom | |
| 2124134B | 2/1984 | United Kingdom | |
| 2218990A | 11/1989 | United Kingdom | |
| 9200798 | 1/1992 | WIPO | B01D 67/00 |

OTHER PUBLICATIONS

"Crop Control", *Modern Plastics*, May 1991, pp. 58–60.

Translation of Japanese Patent Application No. HEI3(1991)–260160.

"Recent Progress in Electret Research", *Topics in Applied Physics*, vol. 33, 2nd ed., 1987, pp. 383–431.

Electrets and Related Electrostatic Charge Storage Phenomena, ©1968 by The Electrochemical Society, Inc.

*Sonochemistry: The Uses of Ultrasound in Chemistry*, Mason, T. J., Royal Society of Chemistry, pp. 83, 85.

HYDROSONIC PROCESS FOR FORMING ELECTRET FILTER MEDIA

RELATED APPLICATIONS

Other patent applications dealing with applications of hydrosonics by the present inventors include U.S. patent application Ser. No. 07/769,050 entitled "Hydrosonically Microapertured Thin Thermoset Sheet Materials"; U.S. patent application Ser. No. 07/769,047 entitled "Hydrosonically Microapertured Thin Thermoplastic Sheet Materials"; U.S. patent application Ser. No. 07/768,782 entitled "Pressure Sensitive Valve System and Process For Forming Said System"; U.S. patent application Ser. No. 07/768,494 entitled "Hydrosonically Embedded Soft Thin Film Materials and Process For Forming Said Materials"; U.S. patent application Ser. No. 07/768,788 entitled "Hydrosonically Microapertured Thin Naturally Occurring Polymeric Sheet Materials and Method of Making the Same"; U.S. patent application Ser. No. 07/769,048 entitled "Hydrosonically Microapertured Thin Metallic Sheet Materials"; U.S. patent application Ser. No. 07/769,045 entitled "Process For Hydrosonically Microaperturing Thin Sheet Materials"; and U.S. patent application Ser. No. 07/767,727 entitled "Process For Hydrosonically Area Thinning Thin Sheet Materials". This first group of applications was filed on Sep. 30, 1991. All of these applications are hereby incorporated by reference.

Additional applications, by the present inventors, directed to applications of hydrosonic energy which are being filed contemporaneously with the present application include U.S. patent application Ser. No. 07/950,100 entitled "Hydrosonically Bonded Nonwoven/Paper Material and Process for Forming the Same"; U.S. patent application Ser. No. 07/949,316 entitled "Method for Forming a Net-Like Material From a Thermoplastic Film"; U.S. patent application Ser. No. 07/950,095 entitled "Process for Hydrosonically Area Embossing Thin Thermoplastic Film Materials and Products Formed Thereby"; and U.S. patent application Ser. No. 07/950,095 entitled "Method for Forming Ultra-Microapertures in Thin Thermoplastic Film Materials and Products Formed Thereby". All of these applications are hereby incorporated by reference.

FIELD OF THE INVENTION

The field of the present invention encompasses electrets and processes for their formation.

BACKGROUND OF THE INVENTION

U.S. Pat No. 4,944,854 to Felton et al. states that it is known that certain dielectric materials can be permanently electrostatically polarized and that these materials are polarized by, (1) exciting the material by heating, (2) applying a high-voltage electric field, and (3) cooling the material while under the influence of the electric field. Upon removal of the electric field, appropriate dielectric materials will be found to have become the electrical analog of a permanent magnet. A dielectric becomes an electret when the rate of decay of the field-induced polarization can be slowed down so much that a significant fraction of the polarization is preserved long after the polarizing field has been removed.

The Felton et al. '854 patent continues by stating that early methods for the formation of fibrous electrets from thermoplastic films or filaments involved disposing the thread or filaments in an electrostatic field established between parallel closely spaced electrodes. This process, which is disclosed in U.S. Pat. No. 2,740,184, heats the thread or filamentary material to soften it and then cools the material in the presence of the electrostatic field whereupon charges are introduced into the fibers. The voltage employed in charging the material is 4000 volts or more of direct current. The filamentary material itself is a hollow filamentary material having a wax core such as carnauba wax, the resultant product being described as having a "more or less permanent charge". In order to produce that degree of permanence of charge in a non-wax electret, such as for instance a polyolefin electret, it has been found that substantially higher voltages must be employed, that is to say direct current voltages in the range of 8000 volts or more. When such higher voltages are employed, the electret field will break down and arcing will occur in the free air space surrounding the single fiber or filamentary material employed according to the teachings of U.S. Pat. No. 2,740,184.

The Felton et al. '854 patent further states that arcing produced from high voltages, that is to say voltages of 8000 volts direct current or higher, may be circumvented by covering the electrodes with a poorly conductive material so as to evenly distribute the applied voltage and dampen possible dielectric breakdown. For instance, U.S. Pat. No. 3,571,679 discloses a process for forming electrets by closely winding a monofilament fiber such as a polypropylene fiber on a hollow winding roller which has been previously surfaced with a polyamide faced aluminum foil. Subsequent to winding the layer of fibers, a second polyamide faced aluminum foil is wound about the yarn layer. The fiber and foil wound roll is then disposed between two electrodes where it is polarized for three hours at a temperature of about 120° C. with a voltage of 200 volts. This method, however, is discontinuous and extremely slow in that charging times of about three hours for the wrapped roll are required.

The Felton et al. '854 patent also states that as a result of such deficiencies, electrets were then commonly produced by either a spray spinning technique such as that set forth in U.S. Pat. No. 4,215,682 wherein an electric charge is introduced into meltblown fibers during the melt-blowing process, or alternatively, the electrets are prepared from a film which is homopolarly charged and subsequently fibrillated (see U.S. Pat. No. 3,998,916).

Other background materials dealing with electrets include (1) the *Introduction* of Topics in Applied Physics, G. M. Sessler, Vol. 33, 2nd ed., 1987, pp 1–12.; (2) *Recent Progress in Electret Research*, Topics in Applied Physics, R. Gerhard-Multhaupt et al., Vol. 33, 2nd ed., 1987, pp 383–431 and (3) *Electrets and Related Electrostatic Charge Storage Phenomena*, L. M. Baxt et. al., The Electrochemical Society, Inc. 1968 (LC no. 68-23768).

One of the difficulties with which those in the art have been faced with is the ability to form an electret which may be used in filtration devices and which is formed from a thin film material without having to subsequently fibrillate the film into fibers or filaments.

As can be seen in the paragraph citing related applications, we have filed several patent applications dealing with applications of hydrosonic energy. A starting point in the understanding of the principles of hydrosonic energy is a fundamental knowledge of ultrasonics.

Ultrasonics is basically the science of the effects of sound vibrations beyond the limit of audible frequencies. Ultrasonics has been used in a wide variety of applications. For example, ultrasonics has been used for (1) dust, smoke and mist precipitation; (2) preparation of colloidal dispersions; (3) cleaning of metal parts and fabrics; (4) friction welding; (5) the formation of catalysts; (6) the degassing and solidification of molten metals; (7) the extraction of flavor oils in brewing; (8) electroplating; (9) drilling hard materials; (10) fluxless soldering and (10) nondestructive testing such as in diagnostic medicine.

The object of high power ultrasonic applications is to bring about some permanent physical change in the material treated. This process requires the flow of vibratory power per unit of area or volume. Depending on the application, the power density may range from less than a watt to thousands of watts per square centimeter. Although the original ultrasonic power devices operated at radio frequencies, today most operate at 20–69 kHz.

The piezoelectric sandwich-type transducer driven by an electronic power supply has emerged as the most common source of ultrasonic power; the overall efficiency of such equipment (net acoustic power per electric-line power) is typically greater than 70%. The maximum power from a conventional transducer is inversely proportional to the square of the frequency. Some applications, such as cleaning, may have many transducers working into a common load.

Other, more particular areas where ultrasonic vibratory force has been utilized are in the areas of thin nonwoven webs and thin films. For example, ultrasonic force has been use to bond or weld nonwoven webs. See, for example, U.S. Pat. Nos. 3,575,752 to Carpenter, 3,660,186 to Sager et al., 3,966,519 to Mitchell et al. and 4,695,454 to Sayovitz et al. which disclose the use of ultrasonics to bond or weld nonwoven webs. U.S. Pat. No. 3,488,240 to Roberts, describes the use of ultrasonics to bond or weld thin films such as oriented polyesters.

Ultrasonic force has also been utilized to aperture nonwoven webs. See, for example, U.S. Pat. Nos. 3,949,127 to Ostermeier et al. and 3,966,519 to Mitchell et al.

Lastly, ultrasonic force has been used to aperture thin film material. See, for example, U.S. Pat. No. 3,756,880 to Graczyk.

Other methods for the aperturing of thin film have been developed. For example, U.S. Pat. No. 4,815,714 to Douglas discusses the aperturing of a thin film by first abrading the film, which is in filled and unoriented form, and then subjecting the film to corona discharge treatment.

As has previously been stated, those in the art had recognized that ultrasonics could be utilized to form apertures in nonwoven webs. See, U.S. patent to Mitchell, et al. Additionally, the Mitchell et al. patent discloses that the amount of ultrasonic energy being subjected to a nonwoven web could be controlled by applying enough of a fluid to the area at which the ultrasonic energy was being applied to the nonwoven web so that the fluid was present in uncombined form. Importantly, the Mitchell, et al. patent states that the fluid is moved by the action of the ultrasonic force within the nonwoven web to cause aperture formation in the web by fiber rearrangement and entanglement. The Mitchell et al. patent also states that, in its broadest aspects, since these effects are obtained primarily through physical movement of fibers, the method of their invention may be utilized to bond or increase the strength of a wide variety of fibrous webs.

DEFINITIONS

As used herein, the term "dielectric" refers to an alternative name for an electrically insulating material. A dielectric is a substance that has very low electrical conductivity, i.e., an insulator. Such substances have electrical conductivities of less than 1 millionth mho per cm. Most polymers, excepting those that are specially produced as conductive or semiconducting polymers, are thus dielectrics.

As used herein, the term "electret" refers to a permanently or semi-permanently polarized piece of dielectric material; the analog of a magnet.

As used herein the term "film" refers to a generally nonporous item that can be arranged in generally planar configuration. For example, films may be formed from thermoplastic, thermoset materials.

As used herein the term "thin film" refers to a film material having an average thickness generally of less than about ten (10) mils. Average thickness is determined by randomly selecting five (5) locations on a given film, measuring the thickness of the film at each location to the nearest 0.1 mil, and averaging the five values (sum of the five values divided by five).

As used herein the term "mesh count" refers to the number which is the product of the number of wires in a wire mesh screen in both the machine (MD) and cross-machine (CD) directions in a given unit area. For example, a wire mesh screen having 100 wires per inch in the machine direction and 100 wires per inch in the cross machine direction would have a mesh count of 10,000 per square inch. As a result of the interweaving of these wires, raised areas are present on both sides of the mesh screen. The number of raised areas on one side of such a wire mesh screen is generally one-half of the mesh count.

As used herein the term "aperture" refers to a generally linear hole or passageway. Aperture is to be distinguished from and does not include holes or passageways having the greatly tortuous path or passageways found in membranes. This term is also meant to include an aperture which is present only upon an application of a physical stimulus. For example, a puncture point in an elastomeric film which opens to form an aperture upon the film being stretched or elongated.

As used herein the term "microaperture" refers to an aperture which has an area of less than about 100,000 square micrometers. The area of the microaperture is to be measured at the narrowest point in the linear passageway or hole.

As used herein the term "ultrasonic vibrations" refers to vibrations having a frequency of at least about 20,000 cycles per second. The frequency of the ultrasonic vibrations may range from about 20,000 to about 400,000 cycles per second or more.

As used herein the term "hydrosonics" refers to the application of ultrasonic vibrations to a material where the area of such application is has had a liquid applied thereto to the extent that the liquid is present in sufficient quantity to generally fill the gap between the tip of the ultrasonic horn and the surface of the material.

OBJECTS OF THE INVENTION

Accordingly, it is a general object of the present invention is to provide a process for forming an electret from a hydrosonically apertured film.

Another object of the present invention is to provide an electret formed from a hydrosonically apertured film.

Still further objects and the broad scope of applicability of the present invention will become apparent to those of skill in the art from the details given hereinafter. However, it should be understood that the detailed description of the presently preferred embodiments of the present invention is given only by way of illustration because various changes and modifications well within the spirit and scope of the invention will become apparent to those of skill in the art in view of this detailed description.

SUMMARY OF THE INVENTION

In response to the foregoing problems and difficulties encountered by those in the art, we have developed a method for forming an electret filter medium including the steps of: (1) hydrosonically providing a thin film material with at least about 1,000 microapertures per square inch with each of the microapertures having an area ranging from about 10 to about 100,000 square micrometers; and (2) corona discharge treating the thin film material to instill a positive charge of at least about 100 volts on one surface of the film and a negative charge of at least about 100 volts on the other surface of the film.

In some embodiments, the positively charged surface is instilled with a positive charge of at least about 150 volts. For example, the positively charged surface may be instilled with a positive charge of at least about 250 volts. More particularly, the positively charged surface may be instilled with a positive charge of at least about 500 volts.

In some embodiments, the negatively charged surface may be instilled with a negative charge of at least about 150 volts. For example, the negatively charged surface may be instilled with a negative charge of at least about 250 volts. More particularly, the negatively charged surface may be instilled with a negative charge of at least about 500 volts.

The invention is also directed to an electret filter medium which includes a thin film material having least about 1,000 microapertures per square inch with each of the microapertures having an area ranging from about 10 to about 100,000 square micrometers.

The film material is a dielectric material selected from the group including one or more polyolefins, polyesters, polycarbonates, polyhalocarbons or natural rubber. For example, the polyolefin may be a polyethylene or a polypropylene.

In some embodiments, the film material may be provided with at least about 5,000 microapertures per square inch. For example the film material may be provided with at least about 20,000 microapertures per square inch. More particularly, the film material may be provided with at least about 90,000 microapertures per square inch. Even more particularly, the film material may be provided with at least about 160,000 microapertures per square inch. In some of these embodiments the area of each of the formed microapertures may generally range from at least about 10 square micrometers to about 10,000 square micrometers. For example, the area of each of the formed microapertures may generally range from at least about 10 square micrometers to about 5,000 square micrometers. More particularly, the area of each of the formed microapertures or may generally range from at least about 10 square micrometers to about 1,000 square micrometers. Even more particularly, the area of each of the formed microapertures may generally range from at least about 10 square micrometers to about 100 square micrometers.

DETAILED DESCRIPTION OF THE INVENTION

Figure 1:
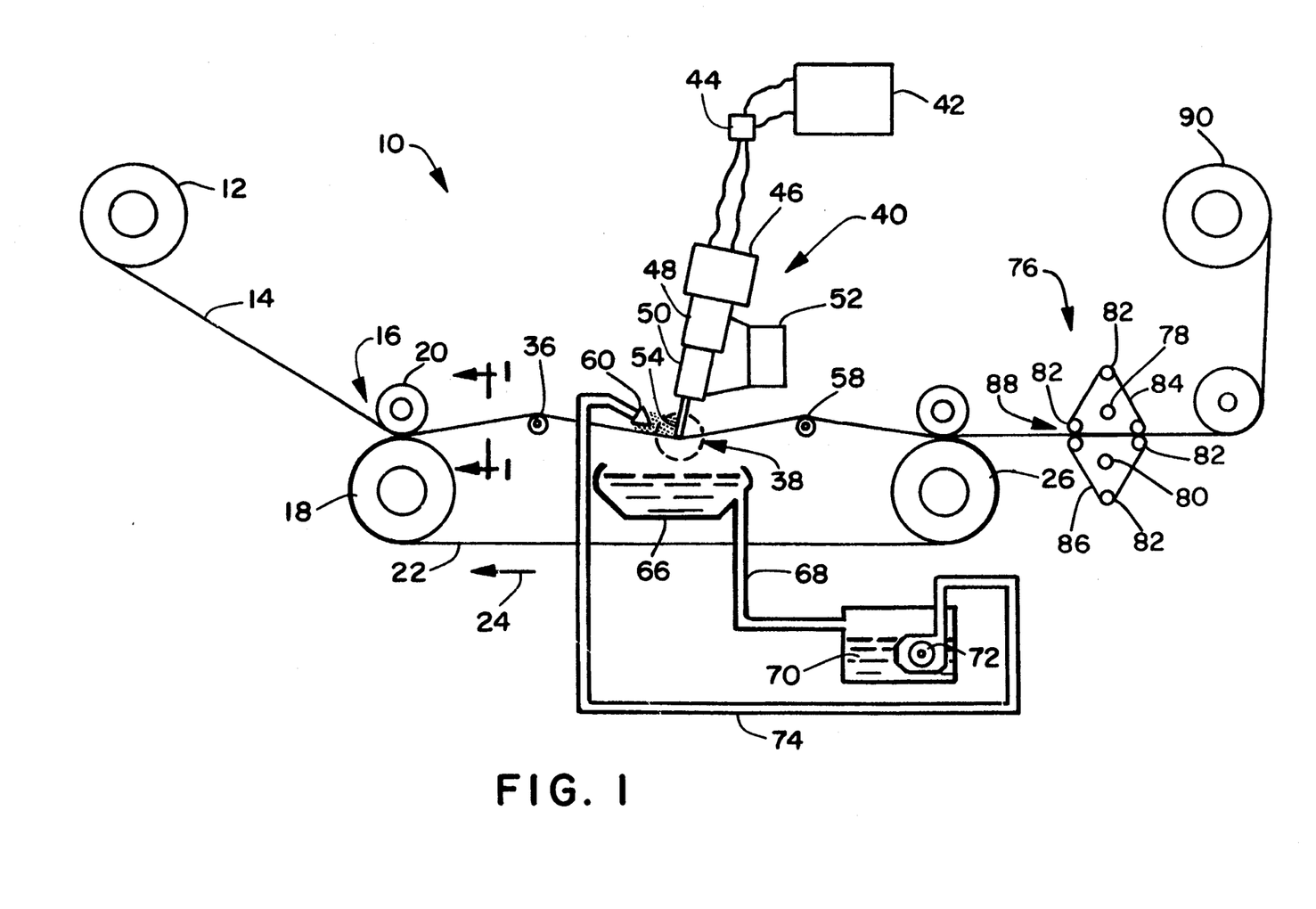
FIG. 1 is a schematic representation of apparatus which may hydrosonically microaperture a thin film material and also provide one surface of the film material with a positive charge and the other surface of the film material with a negative charge.

Turning now to the figures where like reference numerals represent like structure and, in particular to FIG. 1 which is a schematic representation of an apparatus which can carry out the method of the present invention, it can be seen that the apparatus is generally represented by the reference numeral 10. In operation, a supply roll 12 of a thin dielectric film 14 is provided. As has been previously stated, the term thin film refers to films which have an average thickness of about ten (10) mils or less. Additionally, generally speaking, the average thickness of the thin film 14 will be at least about 0.25 mil. For example, the average thickness of the thin film 14 material may range from about 0.25 mil to about 5 mils. More particularly, the average thickness of the thin film 14 may range from about 0.25 mil to about 2 mils. Even more specifically, the average thickness of the thin film 14 may range from about 0.5 mil to about 1 mil.

The thin dielectric film 14 may be formed from a wide variety of dielectric materials. For example, the thin film 14 may be formed from a material selected from the group including one or more polyolefins, polyesters, polycarbonates, polyhalocarbons or natural rubber. For example, the polyolefin may be a polyethylene or a polypropylene.

The thin film 14 is transported to a first nip 16 formed by a first transport roll 18 and a first nip roller 20 by the action of an endless transport mechanism 22 which moves in the direction indicated by the arrow 24. The transport mechanism 22 is driven by the rotation of the first transport roller 18 in conjunction with a second transport roller 26 which, in turn are driven by a conventional power source, not shown.

Figure 2:
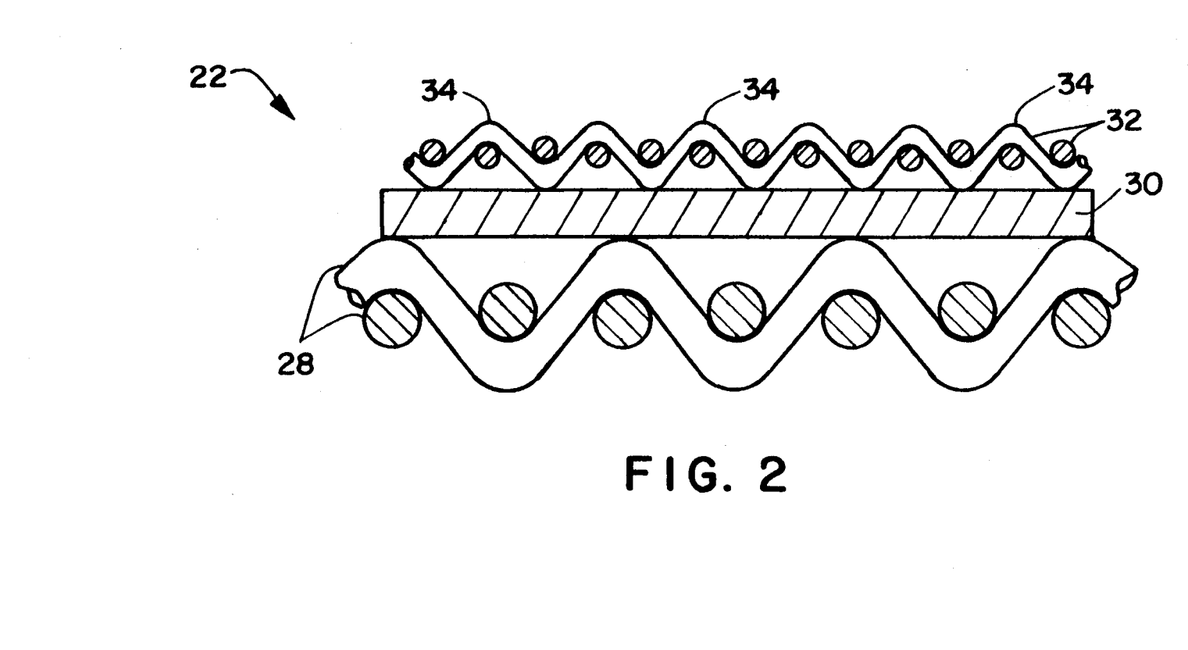
FIG. 2 is a cross sectional view of the transport mechanism depicted in FIG. 1 taken along lines 1—1 in FIG. 1.

FIG. 2 is a cross sectional view of the transport mechanism 22 taken along lines 1—1 in FIG. 1. FIG. 2 discloses that the transport mechanism 22 includes a heavy duty transport wire mesh screen 28 usually having a mesh count of less than about 400 (i.e. less than a 20 wires per inch MD by 20 wires per inch CD mesh screen if machine direction (MD) and cross machine direction (CD) wire count is the same). Heavy duty mesh wire screens of this type may be made from a variety of materials such as, for example, plastics, nylons or polyesters, and are readily available to those in the art. Located above and attached to the transport screen 28 is an endless flat shim plate 30. The shim plate 30 desirably is formed from stainless steel. However, those of skill in the art will readily recognize that other materials may be utilized. Located above and attached to the shim plate 30 is a fine mesh wire pattern screen 32 usually having a mesh count of at least about 2,000 (i.e. at least about 45 wires per inch MD by 45 wires per inch CD mesh screen if MD and CD wire count is the same). Fine mesh wire screens of this type are readily available to those in the art. The fine mesh wire screen 32 has raised areas or knuckles 34 which perform the function of a pattern anvil as will be discussed later.

From the first nip 16 the thin film 14 is transported by the transport mechanism 22 over a tension roll 36 to an area 38 (defined in FIG. 1 by the dotted lined circle) where the thin film 14 is subjected to ultrasonic vibrations.

The assembly for subjecting the thin film 14 to the ultrasonic vibrations is conventional and is generally designated at 40. The assembly 40 includes a power supply 42 which, through a power control 44, supplies power to a piezoelectric transducer 46. As is well known in the art, the piezoelectric transducer 46 transforms electrical energy into mechanical movement as a result of the transducer's vibrating in response to an input of electrical energy. The vibrations created by the piezoelectric transducer 46 are transferred, in conventional manner, to a mechanical movement booster or amplifier 48. As is well known in the art, the mechanical movement booster 48 may be designed to increase the amplitude of the vibrations (mechanical movement) by a known factor depending upon the configuration of the booster 48. In further conventional manner, the mechanical movement (vibrational energy) is transferred from the mechanical movement booster 48 to a conventional knife edge ultrasonic horn 50. It should be realized that other types of ultrasonic horns 50 could be utilized. For example, a rotary type ultrasonic horn could be used. The ultrasonic horn 50 may be designed to effect yet another boost or increase in the amplitude of the mechanical movement (vibrations) which is to be applied to the thin film 14. Lastly, the assembly includes an actuator 52 which includes a pneumatic cylinder, not shown. The actuator 52 provides a mechanism for raising and lowering the assembly 40 so that the tip 54 of the ultrasonic horn 50 can apply tension to the transport mechanism 22 upon the assembly 40 being lowered. It has been found that it is necessary to have some degree of tension applied to the transport mechanism 22 upon the lowering of the assembly for proper application of vibrational energy to the thin film 14 to form microapertures in the thin film 14. One desirable aspect of this tensioned arrangement is that the need to design a finely toleranced gap between the tip 54 of the horn 50 and the raised areas or knuckles 34 of the fine mesh wire screen 32 is not necessary.

Figure 3:
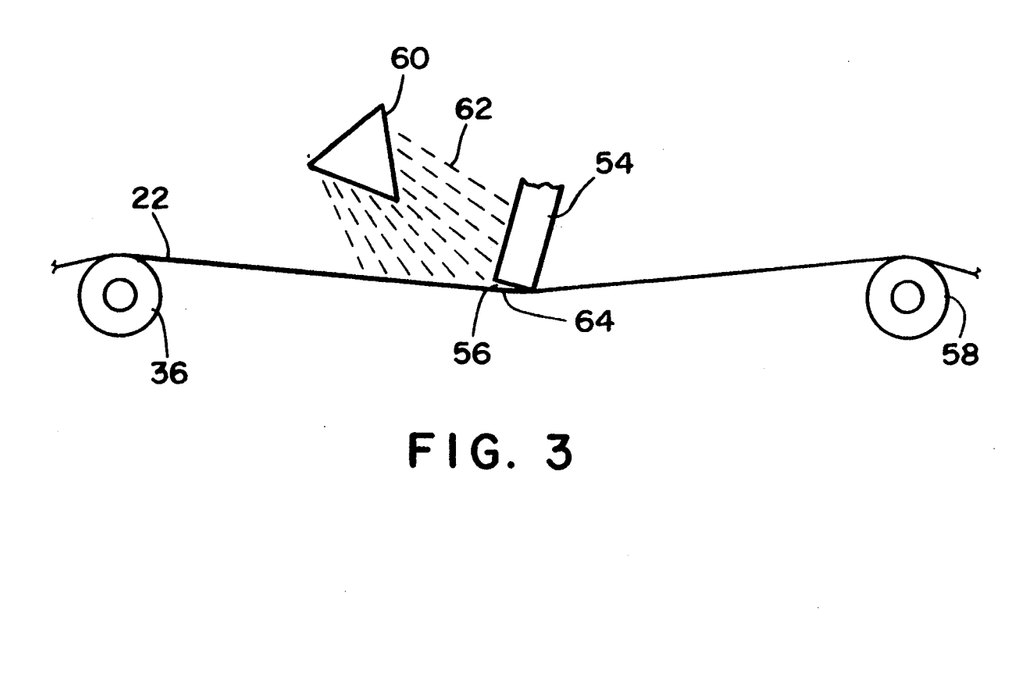
FIG. 3 is a schematic representation of the dotted line area depicted in FIG. 1 where the ultrasonic vibrations are applied to the film which is to be transformed into an electret.

FIG. 3 is a schematic representation of the area 38 where the ultrasonic vibrations are applied to the thin film 14. As can be seen in FIG. 3, the transport mechanism 22 forms an angle 56 with the tip 54 of the ultrasonic horn 50. While some microaperturing will occur if the angle 56 is as great as 45 degrees, it has been found that it is desirable for the angle 56 to range from about 5 degrees to about 15 degrees. For example, the angle 56 may range from about 7 to about 13 degrees. More particularly, the angle 56 may range from about 9 to about 11 degrees.

FIG. 3 also illustrates that the transport mechanism 22 is supported from below by the first tension roll 36 and a second tension roll 58. Positioned somewhat prior to the tip 54 of the ultrasonic horn 50 is a spray nozzle 60 which is configured to apply a fluid 62 to the surface of the thin film 14 just prior to the sheet material's 14 being subjected to ultrasonic vibrations by the tip 54 of the ultrasonic horn 50. The fluid 62 desirably may be selected from the group including one or more of water; mineral oil; a chlorinated hydrocarbon; ethylene glycol; or a solution of 50 volume percent water and 50 volume percent 2 propanol. For example, in some embodiments the chlorinated hydrocarbon may be selected from the group including 1,1,1 trichloroethane or carbon tetrachloride. It should be noted that the wedge-shaped area 64 formed by the tip 54 of the ultrasonic horn 50 and the transport mechanism 22 should be subjected to a sufficient amount of the fluid 62 for the fluid 62 to act as both a heat sink and a coupling agent for the most desirable results. Positioned below the transport mechanism 22 in the area where the tip 54 of the ultrasonic horn 50 is located is a fluid collection tank 66. (See FIG. 1.) The fluid collection tank 66 serves to collect fluid 62 which has been applied to the surface of the thin film 14 and which has either been driven through the film 14 and/or the transport mechanism 22 or over the edges of the transport mechanism 22 by the action of the vibrations of the tip 54 of the ultrasonic horn 50. Fluid 62 which is collected in the collection tank 66 is transported by tubing 68 to a fluid holding tank 70.

FIG. 1 illustrates that the fluid holding tank 70 contains a pump 72 which, by way of additional tubing 74, supplies the fluid 62 to the fluid spray nozzle 60. Accordingly, the fluid 62 may be re-cycled for a considerable period of time.

While the mechanism of action may not be fully understood and the present application should not be bound to any particular theory or mechanism of action, it is believed that the presence of the fluid 62 in the wedge-shaped area 64 during operation of the ultrasonic horn 50 accomplishes two separate and distinct functions. First, the presence of the fluid 62 allows the fluid 62 to act as a heat sink which allows the ultrasonic vibrations to be applied to the thin film 14 without the thin film 14 being altered or destroyed as by melting. Secondly, the presence of the fluid 62 in the wedge-shaped area 64 allows the fluid 62 to act as a coupling agent in the application of the vibrations from the ultrasonic horn 50 to the thin film 14.

It has been discovered that the action of the ultrasonic horn 50 on the thin film 14 microapertures the thin film 14 in spite of the fact that there are no fibers to re-arrange to form microapertures as was the case in Mitchell et al. The microapertures are punched through the thin film 14 in the pattern of the raised areas or knuckles 34 of the fine mesh wire pattern screen 32. Generally, the number of microapertures produced will be equal to the number of raised areas or knuckles 34 on the upper surface of the fine mesh wire screen 32. That is, the number of microapertures will generally be one-half the mesh count of a given area of pattern screen 32. For example, if the pattern screen 32 is 100 wires per inch MD by 100 wires per inch CD, the total number of knuckles or raised areas 34 on one side of the pattern wire 32, per square inch, will be 100 times 100 divided by 2. This equals 5,000 microapertures per square inch.

For a 200 wires per inch MD by 200 wires per inch CD pattern screen 32 the calculation yields 20,000 microapertures per square inch. Depending somewhat on the thickness of the thin thermoplastic sheet material 14, at a mesh count of about 90,000 (300 wires per inch MD by 300 wires per inch CD) the wires are so thin as to allow the knuckles 34 on both sides to microaperture the thin thermoplastic sheet material 14 if sufficient force is applied. Thus, a 300 wires per inch MD by 300 wires per inch CD mesh screen yields 90,000 microapertures per square inch; for a 400 wires per inch MD by 400 wires per inch CD mesh—160,000 microapertures per square inch. Of course the MD and CD wire count of the wire mesh screen does not have to be the same.

It should also be noted that the number of microapertures formed may also vary with the number of ultrasonic vibrations to which the thin film 14 is subjected per unit area for a given period of time. This factor may be varied in a number of ways. For example, the number and size of the microapertures will vary somewhat with the line speed of the thin film 14 as it passes underneath the tip 54 of the ultrasonic horn 50. Generally speaking, as line speed increases, first the size of the microapertures decreases and then the number of microapertures decreases. As the number of microapertures decreases the less the pattern of microapertures resembles the pattern of raised areas 34 on the pattern screen 32. The range of line speeds that usually yields microapertures varies with the type of material utilized to form the thin film 14 and the material used as the fluid 62. For thermoplastic polyethylene having a thickness of about 0.5 mil, typical line speeds which usually yield microapertures for a wide variety of fluids range from about 5 to about 25 feet per minute. For example, if water is used as the fluid with polyethylene typical line speeds which usually yield microapertures range from about 5 to about 23 feet per minute. It is believed that, to some extent, the variations in the number of microapertures formed and the size of the microapertures occurs due to the minute variations in the height of the raised areas or knuckles 34 of the fine mesh pattern screen 32. It should be noted that the fine mesh pattern screens used to date have been obtained from conventional everyday sources such as a hardware store. It is also believed that if a pattern screen 32 could be created where all of the raised areas 34 of the screen 32 were of exactly the same height these variations would only occur in uniform fashion with variations of line speed.

As was stated above, the area or size of each of the microapertures formed will vary with the parameters discussed above. The area of the microapertures will also vary with the area of the raised areas of the pattern anvil such as the knuckles 34 on the fine mesh wire screen 32. It is believed that the type of material used in forming the thin film 14 will also vary the area of the microapertures formed if all other parameters are maintained the same. For example, the softer the thin film 14, the easier it is to push the thin film 14 through the raised areas of the fine mesh pattern screen 32. Because the raised areas (knuckles) on the fine mesh screen are generally pyramidal in shape, the deeper the raised area penetrates the thin film 14, the larger the microaperture. In such situations the shape of the microaperture will conform generally to the pyramidal shape of the raised area of the fine mesh screen and the microaperture will be generally pyramidally shaped in the z direction, and will have an area which is greater at one end than at the other. As has been previously stated, the area of the microaperture should be measured at the narrowest point of the aperture. Of course, the height of the raised areas must be greater than the thickness of the thin sheet material 14 for microapertures to be formed and the degree of excess, if any, necessary may vary with the type of film 14 to be microapertured. In any event, the height of the raised areas must be sufficient to punch through the film 14 including any elasticity which might be encountered in the punching operation. That is, the more elastic the film 14, the greater the height of the raised areas has to exceed the thickness of the thin film 14.

In some embodiments it may be necessary to subject the thin film 14 to multiple passes through the apparatus 10 in order to microaperture the film 14. In such situations the thin film 14 will initially only be thinned in the pattern of the pattern anvil's raised areas. However, after two or more passes through the apparatus 10, with the thin film 14 being aligned in the same configuration with respect to the pattern anvil, microapertures may be formed. Essentially what is happening in these situations is that the thin film 14 is repeatedly thinned by repeated application of ultrasonic vibrational force until such time as microapertures are formed. Alternatively, the fine mesh wire diameter size may be increased with the consequent decrease in mesh count. Increasing the wire diameter size of the fine mesh screen 32 increases the likelihood that microapertures will be formed.

Another feature of the present invention is the fact that the microapertures can be formed in a predesignated area or areas of the thin thermoplastic sheet material 14. This can be accomplished in a number of ways. For example, the thin film 14 may be subjected to ultrasonic vibrations only at certain areas of the film 14, thus, microaperturing would occur only in those areas. Alternatively, the entire thin film 14 could be subjected to ultrasonic vibrations with the pattern anvil having raised areas only at certain locations and otherwise being flat. Accordingly, the thin film 14 would be microapertured only in those areas which correspond to areas on the pattern anvil having raised areas.

It should also be noted that some limitation exists in the number of microapertures which can be formed in a given thin film 14 on a single application of vibrational energy, i.e. a single pass through the apparatus if a wire mesh screen is used as the pattern anvil. This follows from the fact that, as was stated above, the height of the raised areas must exceed the thickness of the thin film 14 in conjunction with the fact that, generally, as the mesh count increases the height of the raised areas or knuckles decreases. In such situations, if the number of microapertures desired per unit area is greater than the number which can be formed in one pass through the apparatus, multiple passes are necessary with the alignment of the thin film 14 with respect to the raised areas being altered or shifted slightly on each pass.

Generally speaking the area of each of the microapertures is greater than about ten square micrometers. That is the area of each of the microapertures may range from at least about 10 square micrometers to about 100,000 square micrometers. For example, the area of each of the formed microapertures may generally range from at least about 10 square micrometers to about 10,000 square micrometers. More particularly, the area of each of the formed microapertures may generally range from at least about 10 square micrometers to about 1,000 square micrometers. Even more particularly, the area of each of the formed microapertures may generally range from at least about 10 square micrometers to about 100 square micrometers.

A number of important observations about the process may now be made. For example, it should be understood that the presence of the fluid 62 is highly important to the present inventive process which uses the fluid 62 as a coupling agent. Because a coupling agent is present, the microapertures are punched through the film 14 as opposed to being formed by melting. Additionally, the presence of the shim plate 30 or its equivalent is necessary in order to provide an anvil mechanism against which the thin film 14 may be worked, that is apertured, by the action of the tip 54 of the ultrasonic horn 50. Because the vibrating tip 54 of the ultrasonic horn 50 is acting in a hammer and anvil manner when operated in conjunction with the heavy duty mesh screen 28/shim plate 30/fine wire mesh 32 combination, it should be readily recognized that a certain degree of tension must be placed upon the transport mechanism 22 by the downward displacement of the ultrasonic horn 50. If there is little or no tension placed upon the transport mechanism 22, the shim plate 30 cannot perform its function as an anvil and microaperturing generally does not occur. Because both the shim plate 30 and the fine mesh pattern wire 32 form the resistance that the ultrasonic horn 50 works against, they may be collectively referred to as a pattern anvil combination. It should be easily recognized by those in the art that the function of the pattern anvil can be accomplished by other arrangements than the heavy duty mesh screen 28/shim plate 30/fine mesh screen 32 combination. For example, the pattern anvil could be a flat plate with raised portions acting to direct the microaperturing force of the ultrasonic horn 50. Alternatively, the pattern anvil could be a cylindrical roller having raised areas. If the pattern anvil is a cylindrical roller with raised areas, it is desirable for the pattern anvil to be wrapped or coated with or made from a resilient material. Where the pattern anvil is a mesh screen the resiliency is provided by the fact that the screen is unsupported directly below the point of application of ultrasonic vibrations to the mesh screen.

FIG. 1 reveals that, after the thin film 14 has been microapertured, the film 14 is passed through a corona discharge treating apparatus 76. Generally speaking, the apparatus 76 includes a positive electrode 78 positioned adjacent one surface of the film 14 and a negative electrode 80 positioned adjacent the other surface of the film 14. Also present are transport rollers 82 which are arranged around each of the electrodes 78, 80. Two contact webs 84, 86 are arranged, respectively, about each of the electrodes 78, 80. The film 14 is fed into the nip 88 formed by the two leading transport rollers 82 and is sandwiched between the two transport webs 84, 86 at the time that the film 14 is subjected to the application of corona discharge from the electrodes 78, 80. It should be noted that, for the process to work properly, the transport webs (continuous belts) should be formed from a material which will conduct the electrical charge of the corona unit to the dielectric film 14. Desirable materials for forming the transport webs 84, 86 include, for example, cellulosic fiber such as cotton, wood pulp, or hemp or mixtures of the fibers. It may also be made from fibers of a dielectric material which are bonded together with a conductive binder. The transport webs 84, 86 should have poorer dielectric properties than the film 14 which is being subjected to corona discharge treatment. Accordingly, the transport webs 84, 86 should not retain any significant electrical charge. The apparatus 76 also includes a conventional power source (not shown) which energizes the electrodes 78 and 80. The transport rollers 82 are separately powered by a conventional drive motor so that the transport webs 84, 86 move with the film 14 as it passes between the electrodes 78, 80. The electrodes are configured and designed to apply a positive charge of at least about 100 volts to one surface of the film 14 and/or a negative charge of at least about 100 volts to the other surface of the film 14. For example, the electrodes may apply a positive charge of at least about 150 volts to one surface of the film 14 and/or a negative charge of at least about 150 volts to the other surface of the film 14. More particularly, the electrodes may apply a positive charge of at least about 250 volts to one surface of the film 14 and/or a negative charge of at least about 250 volts to the other surface of the film 14. Even more particularly, the electrodes may apply a positive charge of at least about 500 volts to one surface of the film 14 and/or a negative charge of at least about 500 volts to the other surface of the film 14. Of course, if desired, the same amount of charge does not have to be applied to each surface of the film 14. To assist in the application of the charge to the film 14, it may be desirable to elevate the temperature of the film 14 while the film 14 is being subjected to the corona discharge treatment. The degree of elevation of the temperature of the film 14 will vary with the type of film 14 which is being utilized. Generally speaking, as is known in the art, the film 14 is elevated to a temperature in excess of the material's glass transition temperature.

After application of the corona discharge treatment, the charged, microapertured film is wound up for storage on roll 90.

The invention will now be discussed with regard to specific examples which will aid those of skill in the art in a full and complete understanding thereof.

EXAMPLE I

A sheet of 0.5 mil thick polyethylene film obtained from Edison Plastics of Plainfield, N.J. and having the trade designation of S/E 702 was cut into a length of about 8.5 inches and a width of about 11 inches. The sample was processed in accordance with the present invention.

A model 1120 power supply obtained from the Branson Company of Danbury, Conn., was utilized. This power supply, which has the capacity to deliver 1,300 watts of electrical energy, was used to convert 115 volt, 60 cycle electrical energy to 20 kilohertz alternating current. A Branson type J4 power level control, which has the ability to regulate the ultimate output of the model 1120 power supply from 0 to 100%, was connected to the model 1120 power supply. In this example, the power level control was set at 100%. The actual amount of power consumed was indicated by a Branson model A410A wattmeter. This amount was about 660 watts.

The output of the power supply was fed to a model 402 piezoelectric ultrasonic transducer obtained from the Branson Company. The transducer converts the electrical energy to mechanical movement. At 100% power the amount of mechanical movement of the transducer is about 0.8 micrometers.

The piezoelectric transducer was connected to a mechanical movement booster section obtained from the Branson Company. The booster is a solid titanium metal shaft with a length equal to one-half of the wave length of the 20 kilohertz resonant frequency. Boosters can be machined so that the amount of mechanical movement at their output end is increased or decreased as compared to the amount of movement of the transducer. In this example the booster increased the amount of movement and has a gain ratio of about 1:2.5. That is, the amount of mechanical movement at the output end of the booster is about 2.5 times the amount of movement of the transducer.

The output end of the booster was connected to an ultrasonic horn obtained from the Branson Company. The horn in this example is made of titanium with a working face of about 9 inches by about ½ inch. The leading and trailing edges of the working face of the horn are each curved on a radius of about ⅛ inch. The horn step area is exponential in shape and yields about a two-fold increase in the mechanical movement of the booster. That is, the horn step area has about a 1:2 gain ratio. The combined increase, by the booster and the horn step area, in the original mechanical movement created by the transducer yields a mechanical movement of about 4.0 micrometers.

The forming table arrangement included a small forming table which was utilized to transport and support the polyethylene film. The forming table included two 2-inch diameter idler rollers which were spaced about 12 inches apart on the surface of the forming table. A transport mesh belt encircles the two idler rollers so that a continuous conveying or transport surface is created. The transport mesh belt is a square weave 20×20 mesh web of 0.020 inch diameter plastic filaments. The belt is about 10 inches wide and is raised above the surface of the forming table.

The transducer/booster/horn assembly, hereinafter the assembly, is secured in a Branson series 400 actuator. When power is switched on to the transducer, the actuator, by means of a pneumatic cylinder with a piston area of about 4.4 square inches, lowers the assembly so that the output end of the horn contacts the polyethylene film being processed. The actuator also raises the assembly so that the output end of the horn is removed from contact with the film when power is switched off.

The assembly is positioned so that the output end of the horn is adapted so that it may be lowered to contact the transport mesh belt between the two idler rollers. An 8-inch wide 0.005-inch thick stainless steel shim stock having a length of about 60 inches was placed on the plastic mesh transport belt to provide a firm support for a pattern screen which is placed on top of the stainless steel shim. In this example the pattern screen is a 200 by 200 mesh wire size weave stainless steel screen. The film which was then fastened onto the pattern wire using masking tape.

The forming table arrangement also included a fluid circulating system. The circulating system includes a fluid reservoir tank, a fluid circulating pump which may conveniently be located within the tank, associated tubing for transporting the fluid from the tank to a slotted boom which is designed to direct a curtain of fluid into the juncture of the output end of the horn and the film.

In operation, the assembly was positioned so that the output end of the horn was at an angle of from about 10 to 15 degrees to the film. Accordingly, a wedge shaped chamber was formed between the output end of the horn and the film. It is into this wedge shaped chamber that the fluid, in this example water, at room temperature, was directed by the slotted boom.

It should be noted that the actuator was positioned at a height to insure that, when the assembly is lowered, the downward movement of the output end of the horn is stopped by the tension of the transport mesh before the actuator reaches the limit of its stroke. In this example, actuating pressure was adjusted to 15 pounds per square inch as read on a pressure gauge which is attached to the pneumatic cylinder of the actuator. This adjustment results in a total downward force of 66.0 pounds. (15 psi times 4.4 square inches of piston area equals 66.0 pounds of force.)

The sequence of operation was (1) the fluid pump was switched on and the area where the output end of the horn was to contact the film was flooded with water; (2) the transport mesh conveyor system was switched on and the film started moving at 7.7 feet per minute; and (3) power to the assembly was supplied and the assembly was lowered so that the output end of the horn contacted the film while the sample continued to pass under the output end of the horn until the end of the sample was reached. The reading on the A410A wattmeter during the process is an indication of the energy required to maintain maximum mechanical movement at the output end of the horn while working against the combined mass of the water, the polyethylene film, the pattern wire, the shim stock, and the transport wire.

After the film had been microapertured, the film was passed through a corona discharge treatment assembly which consisted of a positive and negative electrode spaced 1.5 inches above and below the film with each being powered by a 25 kilovolt power supply. (R.C.-3 Chargemaster charging bar electrode #4001165; power units P/N 25A Simco Co, Inc. Hatfield, Pa.) The transport webs were obtained from the Dexter Corp. of Windsor Locks, Conn. and were wetlaid latex bonded contact webs (#03768W9303). The film was passed through the corona discharge unit at a speed of about 5 to 10 feet per minute. The corona discharge treatment assembly applied 238 positive volts to one surface of the film and 157 negative volts to the other surface of the film.

This example yielded an electret formed from a 0.5 mil thick polyethylene film having a maximum microaperture density of about 20,000 microapertures per square inch.

EXAMPLE II

The process of Example I was repeated. The corona discharge treatment assembly applied 195 positive volts to one side of the film and 182 negative volts to the other side of the film.

This example yielded an electret having a maximum microaperture density of about 20,000 microapertures per square inch.

EXAMPLE III

The process of Example I was repeated except the film was 0.5 mil Phanex polyester film obtained from the Pilcher Hamilton Corp. of Broadview, Ill. The line speed was about 2.6 feet per minute, a 120 by 120 fine wire mesh stainless steel screen was used, the actuating pressure was about 15 pounds per square inch and the watts consumed were about 850. Four passes were made in this example. The corona discharge treatment assembly applied 563 positive volts to one side and 452 negative volts to the other side of the film. This example yielded an electret formed from 0.5 mil thick polyester film having a maximum microaperture density of about 28,000 microapertures per square inch.

EXAMPLE IV

The process of Example I was repeated excepted a sheet of 4.0 mil thick, lightly cross-linked natural rubber having the trade designation Softlastic Rubber TS 3000 (J. P. Stevens Co., Northampton, Mass.). The sheet of natural rubber was stretched 100 percent and held in the stretched position by a jig laid on the wire with the jig being fastened to the wire. The wire screen was 18 by 23 mesh stainless steel. Actuating pressure was about 8 pounds, the line speed 8.5 feet per minute, about 880 watts of power were consumed. The corona discharge treatment assembly applied 209 positive volts to one side of the sheet and 150 volts to the other side of the sheet. This example yielded an electret formed from a 4.0 mil natural rubber sheet having a maximum valved area of 828 valves per square inch. The valve area opening depends upon the applied force with a maximum functional aperture area in excess of 100,000 square micrometers.

EXAMPLE V

The process of Example IV was repeated except the passage through the corona discharge unit was at one foot per minute. The corona discharge treatment assembly applied 532 positive volts to one side of the sheet and 563 volts to the other side of the sheet. This example yielded an electret formed from a 5.0 mil natural rubber sheet having a maximum valved area of 828 valves per square inch. The valve area opening depends upon the applied force with a maximum functional aperture area in excess of 100,000 square micrometers.

The uses to which the electret of the present invention may be put are numerous. These include, for example, various air filtration applications; capacitive transducers to construct microminiature capacitive microphones; piezoelectric polymer devices such as audio frequency transducers; medical product applications for diagnostic measurements and prosthetic devices; as electromechanical transducers in vibration devices and generators and as infrared sensors in a variety of devices (pyroelectric polymer electrets are employed in infrared videcon tubes).

It is to be understood that variations and modifications of the present invention may be made without departing from the scope of the invention. For example, in some embodiments the use of multiple ultrasonic horns aligned abreast or sequentially may be desirable. It is also to be understood that the scope of the present invention is not to be interpreted as limited to the specific embodiments disclosed herein, but only in accordance with the appended claims when read in light of the foregoing disclosure.

What is claimed is:

1. A process for forming an electret filter medium comprising the steps of:
   providing a thin film of a dielectric material having first and second surfaces and having an average thickness of about 10 mils or less;
   placing the film on a pattern anvil having a pattern of raised areas wherein the height of the raised areas is greater than the thickness of the thin film;
   conveying the film, while placed on the pattern anvil through an area where a fluid selected from the group consisting of one or more of water, mineral oil, a chlorinated hydrocarbon, ethylene glycol and a solution of 50 volume percent water and 50 volume percent 1 propanol is applied to the film;
   subjecting the film to a sufficient amount of ultrasonic vibrations in the area where the fluid is applied to the film to microaperture the film with at least about 1,000 microapertures per square inch in a pattern generally the same as the pattern of raised areas on the pattern anvil and with each of the microapertures having an area ranging from about 10 to about 100,000 square micrometers; and
   corona discharge treating the film to instill a positive charge of at least about 100 volts on said first surface and a negative charge of at least about 100 volts on said second surface.

2. The process according to claim 1, wherein the first surface is instilled with a positive charge of at least about 150 volts and the second surface is instilled with a negative charge of at least about 150 volts.

3. The process according to claim 1, wherein the first surface is instilled with a positive charge of at least about 250 volts and the second surface is instilled with a negative charge of at least about 250 volts.

4. The process according to claim 1, wherein the first surface is instilled with a positive charge of at least about 500 volts and the second surface is instilled with a negative charge of at least about 500 volts.

5. The process of claim 1, wherein the temperature of the film is elevated while the film is being subjected to corona discharge treatment.

6. The process of claim 5, wherein the temperature of the film is elevated to a temperature in excess of the glass transition temperature of the material from which the film is formed.

7. The process of claim 1, wherein the film material is polyethylene.

8. The process of claim 1, wherein the film material is a thermoset material.

9. The process of claim 1, wherein the film material is a naturally occurring material.

10. The process of claim 1, wherein the film is microapertured with at least about 5,000 microapertures per square inch.

11. The process of claim 1, wherein the film is microapertured with at least about 90,000 microapertures per square inch.

12. The process of claim 1, wherein the film is microapertured with at least about 160,000 microapertures per square inch.

13. The process of claim 1, wherein the area of each of the formed microapertures generally ranges from at least about 10 square micrometers to about 10,000 square micrometers.

14. The process of claim 1, wherein the area of each of the formed microapertures generally ranges from at least about 10 square micrometers to about 5,000 square micrometers.

15. The process of claim 1, wherein the area of each of the formed microapertures generally ranges from at least about 10 square micrometers to about 1,000 square micrometers.

16. The process of claim 1, wherein the area of each of the formed microapertures generally ranges from at least about 10 square micrometers to about 100 square micrometers.

17. A process for forming an electret filter medium comprising the steps of:
   providing a thin film of a dielectric material selected from the group consisting of one or more polyolefins, polyesters, polycarbonates, polyhalocarbons and natural rubber, the film having first and second surfaces and an average thickness of about 10 mils or less;

placing the film on a pattern anvil having a pattern of raised areas wherein the height of the raised areas is greater than the thickness of the thin film;

conveying the film, while placed on the pattern anvil, through an area where a fluid selected from the group consisting of one or more of water, mineral oil, a chlorinated hydrocarbon, ethylene glycol and a solution of 50 volume percent water and 50 volume percent 1 propanol is applied to the film;

subjecting the film to a sufficient amount of ultrasonic vibrations in the area where the fluid is applied to the film to microaperture the film with at least about 1,000 microapertures per square inch in a pattern generally the same as the pattern of raised areas on the pattern anvil and with each of the microapertures having an area ranging from about 10 to about 100,000 square micrometers; and corona discharge treating the film to instill a positive charge of at least about 100 volts on said first surface and a negative charge of at least about 100 volts on said second surface.

18. A process for forming an electret filter medium comprising the steps of:

providing a thin film of a dielectric material selected from the group consisting of one or more polyolefins, polyesters, polycarbonates, polyhalocarbons or natural rubber, the film having first and second surfaces and an average thickness of about 10 mils or less;

placing the film on a pattern anvil having a pattern of raised areas wherein the height of the raised areas is greater than the thickness of the thin film;

conveying the film, while placed on the pattern anvil, through an area where a fluid selected from the group consisting of one or more of water, mineral oil, a chlorinated hydrocarbon, ethylene glycol and a solution of 50 volume percent water and 50 volume percent 1 propanol is applied to the film;

subjecting the film to a sufficient amount of ultrasonic vibrations in the area where the fluid is applied to the film to microaperture the film with at least about 20,000 microapertures per square inch in a pattern generally the same as the pattern of raised areas on the pattern anvil and with each of the microapertures having an area ranging from about 10 to about 10,000 square micrometers;

passing the microapertured film between two continuous transport belts with each transport belt being formed from a material comprising cellulosic fibers and wherein each transport belt encircles either the positive or negative electrode of a corona discharge treating apparatus; and corona discharge treating the film to instill a positive charge of at least about 100 volts on said first surface and a negative charge of at least about 100 volts on said second surface.

19. The process of claim 18, wherein the cellulosic fibers are selected from the group consisting of one or more of cotton fibers, wood pulp fibers and hemp fibers.

20. The process of claim 18, wherein the temperature of the film is elevated while the film is being subjected to corona discharge treatment.

21. The process of claim 20, wherein the temperature of the film is elevated to a temperature in excess of the glass transition temperature of the material from which the film is formed.

* * * * *